US010532818B2

(12) United States Patent
Childress

(10) Patent No.: US 10,532,818 B2
(45) Date of Patent: Jan. 14, 2020

(54) WATER LANDING PARACHUTE TRAP AND METHOD

(71) Applicant: The Boeing Company, Chicago, IL (US)

(72) Inventor: Jamie Childress, Mercer Island, WA (US)

(73) Assignee: THE BOEING COMPANY, Chicago, IL (US)

(*) Notice: Subject to any disclaimer, the term of this patent is extended or adjusted under 35 U.S.C. 154(b) by 763 days.

(21) Appl. No.: 15/220,335

(22) Filed: Jul. 26, 2016

(65) Prior Publication Data

US 2018/0029718 A1 Feb. 1, 2018

(51) Int. Cl.
| B64D 17/22 | (2006.01) |
| B64D 1/14 | (2006.01) |
| B64D 17/38 | (2006.01) |
| B64D 25/20 | (2006.01) |
| B63B 22/00 | (2006.01) |
| B64D 1/02 | (2006.01) |

(52) U.S. Cl.
CPC .............. *B64D 17/22* (2013.01); *B63B 22/00* (2013.01); *B63B 22/003* (2013.01); *B64D 1/02* (2013.01); *B64D 1/14* (2013.01); *B64D 17/38* (2013.01); *B64D 25/20* (2013.01)

(58) Field of Classification Search
CPC . B64D 1/08; B64D 1/14; B64D 17/22; B64D 17/24; B64D 17/343; B64D 17/38; B64D 25/18; B64D 25/20; B63B 22/003
See application file for complete search history.

(56) References Cited

U.S. PATENT DOCUMENTS

| 1,300,413 | A |   | 4/1919 | Kee |   |
| 2,972,457 | A | * | 2/1961 | Steinthal | B64D 17/80 244/113 |
| 3,181,809 | A | * | 5/1965 | Lobelle | B64D 45/00 244/1 R |
| 3,282,539 | A | * | 11/1966 | Wiant | B64G 1/62 244/138 R |
| 4,383,831 | A | * | 5/1983 | Cupolo | B63B 22/003 441/22 |
| 5,469,407 | A |   | 11/1995 | Saunders |   |
| 6,400,645 | B1 | * | 6/2002 | Travor | B63B 22/003 367/153 |

FOREIGN PATENT DOCUMENTS

| DE | 4307069 A1 * | 9/1994 | ............ B64D 17/24 |
| JP | H06 71393 | 10/1994 | |
| JP | 2000 255487 | 9/2000 | |
| JP | 2005 008044 | 1/2005 | |

\* cited by examiner

*Primary Examiner* — Richard R. Green
(74) *Attorney, Agent, or Firm* — Haynes and Boone, LLP

(57) ABSTRACT

Systems and methods for aerially delivering cargo into a body of water while avoiding parachute entrapment and entanglement are described. The system includes a parachute having a canopy and suspension lines. The system further includes a weight coupled to a first end of the suspension lines and a ring that is configured to float in the body of water. The weight is coupled to the cargo, and the ring is disposed between the weight and the canopy with the suspension lines passing through the center of the ring.

19 Claims, 15 Drawing Sheets

WATER LANDING PARACHUTE TRAP AND METHOD

BACKGROUND

Technical Field

The present application generally relates to aerial delivery of cargo to a body of water using a parachute. More particularly, it relates to water landing parachute trap and method.

Related Art

Approximately seventy percent of the surface of the Earth is covered with water. Therefore, mankind often seeks to deploy into Earth's waters various waterborne payloads. As one example, scientists often deploy into the oceans various sensors for monitoring conditions (e.g., wind and wave height) and seawater properties (e.g., temperature, pH and salinity). As another example, civilian and military objectives often require the deployment into the oceans of various vehicles, such as autonomous surface vehicles ("ASV") and autonomous underwater vehicles ("AUV").

Waterborne payloads are sometimes deployed into the water from watercraft (e.g., boats and ships). To avoid damaging the payload (or at least reduce the likelihood of damaging the payload), the watercraft typically slows or stops during payload deployment, thereby allowing careful placement of the waterborne payload into the water. However, the ability to slow (let alone stop) a watercraft on the high seas is highly dependent on ambient weather conditions. Deployment of a waterborne payload from a watercraft under adverse weather conditions may become impractical without assuming a substantial risk to the watercraft and/or the payload.

Furthermore, because of the vastness of Earth's oceans, waterborne payloads are also deployed into the water from aircraft. The drop from the aircraft and, ultimately, the impact with the water presents the risk of damaging the waterborne payload. The risk of damage due to impact with the water may be mitigated by using a parachute. However, the introduction of a parachute presents the risk of parachute entrapment and entanglement. Currently, human intervention is typically utilized in the water to disentangle the payload. Therefore, even though technology provides for unmanned and autonomous vehicles, which should not require human intervention, deployment of such vehicles at remote locations remain difficult because human intervention is still utilized to disentangle the payloads. Accordingly, those skilled in the art continue with research and development efforts in the field of aerial and waterborne cargo deployment to reduce the need for human intervention.

SUMMARY

An air drop system and method for aerially delivering and deploying waterborne cargo is described in accordance with various embodiments.

According to a first aspect, an air drop system is described. The system may include: a parachute having a canopy and suspension lines; a weight coupled to a first end of the suspension lines, the weight being couplable to a cargo; and a ring configured to float in a body of water and being disposed between the weight and the canopy, the suspension lines passing through a center of the ring.

A weight releasing device may be coupled to the weight and may also be configured to detach the weight from the cargo.

According to a second aspect, a method for deploying the air drop system is described. The method may include: dropping the system from an aircraft such that the system descends to the body of water with the parachute deployed; detaching the cargo from the weight after the cargo enters the body of water such that the cargo and the weight separate from each other and the weight sinks into the body of water; and pulling the suspension lines by the detached weight through the center of the ring.

According to a third aspect, a method for assembling the air drop system is described. The method may include: attaching the first end of the suspension lines to the weight; positioning the ring on the weight between the weight and the parachute; and packing the parachute and positioning the packed parachute on the ring.

According to a fourth aspect, a method for air-dropping cargo to a body of water using a parachute is described. The method may include: releasing the cargo from a weight coupled to suspension lines of a parachute after the cargo enters the body of water; pulling the suspension lines, by sinking the weight due to gravity, through a center of a ring floating on a surface of the body of water; and collecting the canopy at the ring.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
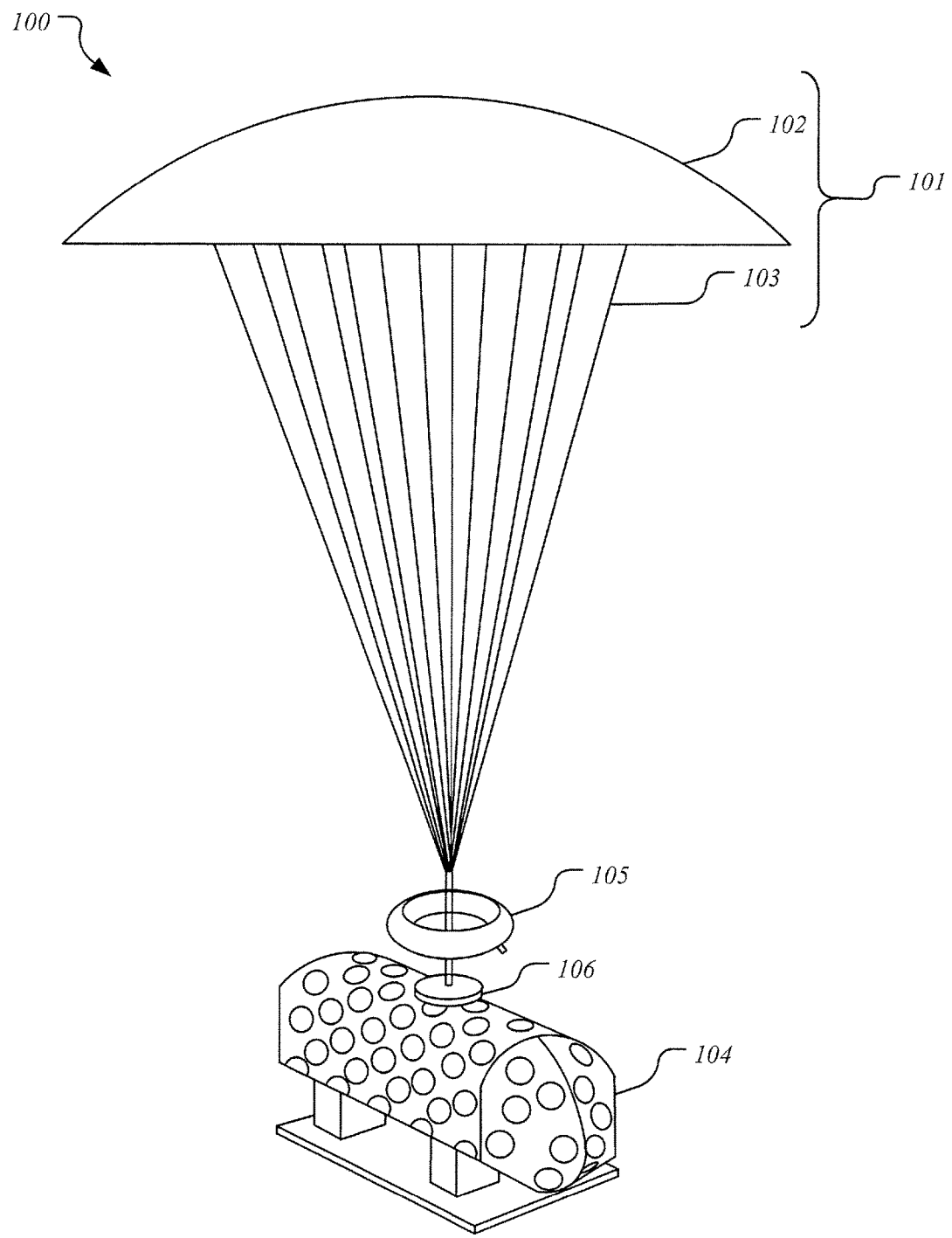
FIG. 1 is an illustration of an air drop system for aerially delivering cargo, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Hereinafter, example embodiments will be described in more detail with reference to the accompanying drawings.

The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

The present disclosure describes a system and a method for aerial delivery of cargo into a body of water using a parachute. The term "cargo" as used herein the present disclosure is intended to refer to a payload and/or any supporting structure, device, or system that are connected to and delivered by the parachute. Cargo may include, for example, a payload protective shell such as the A-DROPS described in related U.S. patent application Ser. No. 14/929,561 filed on Nov. 2, 2015, which is incorporated herein by reference in its entirety. In other examples, cargo may include just the payload such as autonomous unmanned surface and underwater vehicles, rigid hull inflatable boats (RHIBs), sonobuoys, etc. Accordingly, some cargo may be designed to submerge underwater whereas some cargo may be designed to float at the surface of the water. Moreover, some cargo may be designed to sink to the bottom of the body of water whereas some cargo may be neutrally buoyant and therefore may only partially submerge or submerge just a few feet below the surface of the water and remain at that depth without sinking all the way to the bottom. In the present disclosure, a "body of water" may refer to, but is not limited to, an ocean, a lake, and/or a river.

Military aircrafts such as C-17, C-130, V-22, rotary aircraft, and/or other commercial aircraft may be utilized to drop cargo from air to deliver various equipment into a body of water. Generally, as the cargo is dropped from the air (using a parachute), the cargo lands in the water first and the parachute follows the cargo into the water. The precise location in which the parachute lands (in the water) relative to the cargo depends on a number of factors such as the size of the parachute, the presence or strength of wind, length of suspension lines, etc. If the wind is blowing (e.g., greater than 10 knots), then it is likely that the parachute will land to one side of the cargo (e.g., in the vicinity or adjacent to the cargo). On the other hand, if the wind is negligible, then the parachute may land on top of the cargo in the water.

Generally, when a parachute lands in a body of water, it initially floats at the surface because it is light. However, a parachute is generally negatively buoyant and eventually sinks in the body of water. Thus, if the parachute lands on the cargo and then begins to sink, the cargo may become entrapped under the parachute. Even if the parachute lands and begins to sink adjacent the cargo, the cargo may still become entangled in the suspension lines of the parachute. More particularly, if the cargo is a waterborne vehicle such as an unmanned or autonomous vehicle, parts of the parachute may become entangled with various components of the vehicle (e.g., suspension lines may get caught in the propellers of the unmanned vehicle). Thus, disclosed are techniques to avoid or reduce occurrences of parachute entrapment and/or entanglement upon landing in the water. According to various embodiments, the cargo may be configured to automatically detached from the parachute at a predetermined moment after landing in the body of water so as to separate the cargo from the parachute. In further embodiments, the parachute may be collected in a controlled manner at or near the surface of the water through the use of an inflatable ring in order to separate the parachute from the cargo and in order to prevent suspension lines of the parachute from spreading near the cargo. That is, the suspension lines are constrained in the ring so as to prevent them from dispersing in the vicinity of the cargo.

FIG. 1 illustrates an air drop system 100 being aerially delivered, for example, from an aircraft. Air drop system 100 includes a parachute 101 (shown in a deployed state) connected to a cargo 104. Parachute 101 includes a canopy 102 attached to first ends of suspension lines 103 and cargo 104 attached to second ends of suspension lines 103. In some embodiments, cargo 104 may be attached to risers, and the risers may be connected to the second ends of suspension lines 103. A floatable ring 105 is disposed surrounding suspension lines 103 between canopy 102 and cargo 104 such that suspension lines 103 are constrained by ring 105 and also pass through a center opening of ring 105. In this way, as the cargo descends toward the earth, the cargo will land first, and the parachute will land thereafter. While the illustrated air drop system 100 may be utilized for aerial delivery of cargo to land, the embodiments of the present disclosure will be directed toward aerial delivery of the cargo to a body of water.

Figure 2A:
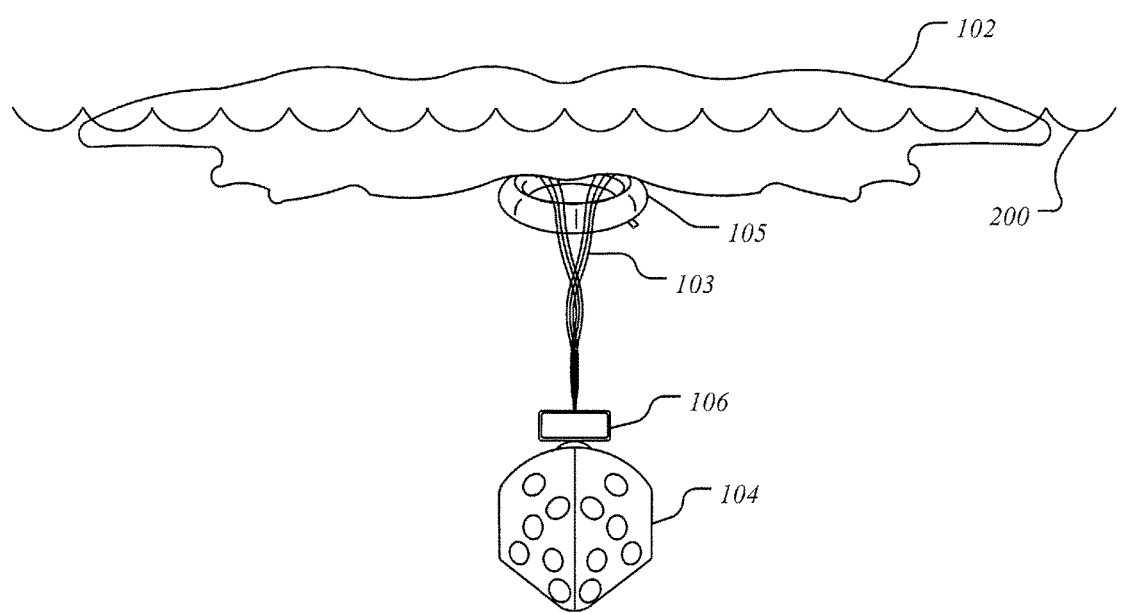
FIGS. 2A-2B illustrate an aerially delivered cargo landing in a body of water, according to an embodiment.
Figure 2B:
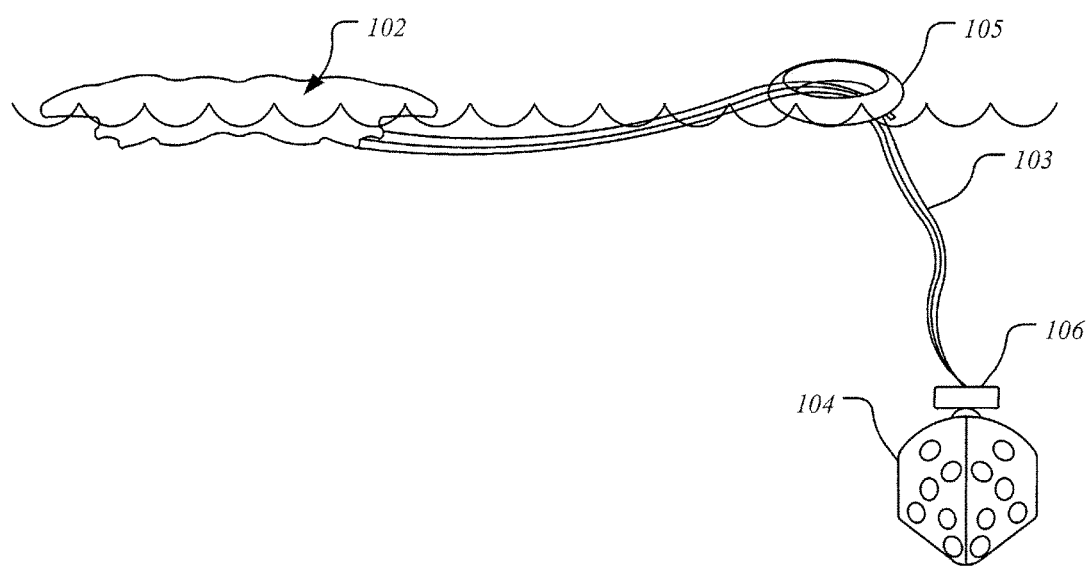

FIGS. 2A-2B show cargo 104 after it has landed in water 200 and has begun to submerge. More specifically, FIG. 2A illustrates a situation where there is little to no wind in the atmosphere directly above the water such that after cargo 104 lands in water 200, parachute 101 lands on top of cargo 104. FIG. 2B illustrates a situation where wind is present in the atmosphere directly over the water such that after cargo 104 lands in water 200, parachute 101 lands in the vicinity of cargo 104 but not necessarily on top of cargo 104. In some embodiments, a G-12 parachute may be utilized. A G-12 parachute may have a canopy diameter of about 64 feet and suspension lines of about 40 feet. Thus, a G-12 parachute may take approximately five seconds to land in water 200 after the cargo lands in water 200. Therefore, in 20 knots of wind, a G-12 parachute may be blown a horizontal distance of about 30 feet in about five seconds. Accordingly, canopy 102 of the parachute 101 is illustrated in FIG. 2B at the surface of water 200 about 30 feet away from cargo 104.

Ring 105 floats at the surface of water 200 with suspension lines 103 passing through the opening of ring 105. Suspension lines 103 are constrained in ring 105 through the opening of ring 105. Suspension lines 103 are coupled to a weight 106, which is coupled to cargo 104. Weight 106 is configured to disconnect from cargo 104 after it lands in the water and weight 106 is configured to pull parachute 101 through ring 105, thus sliding suspension lines 103 through the center of ring 105.

Figure 3:
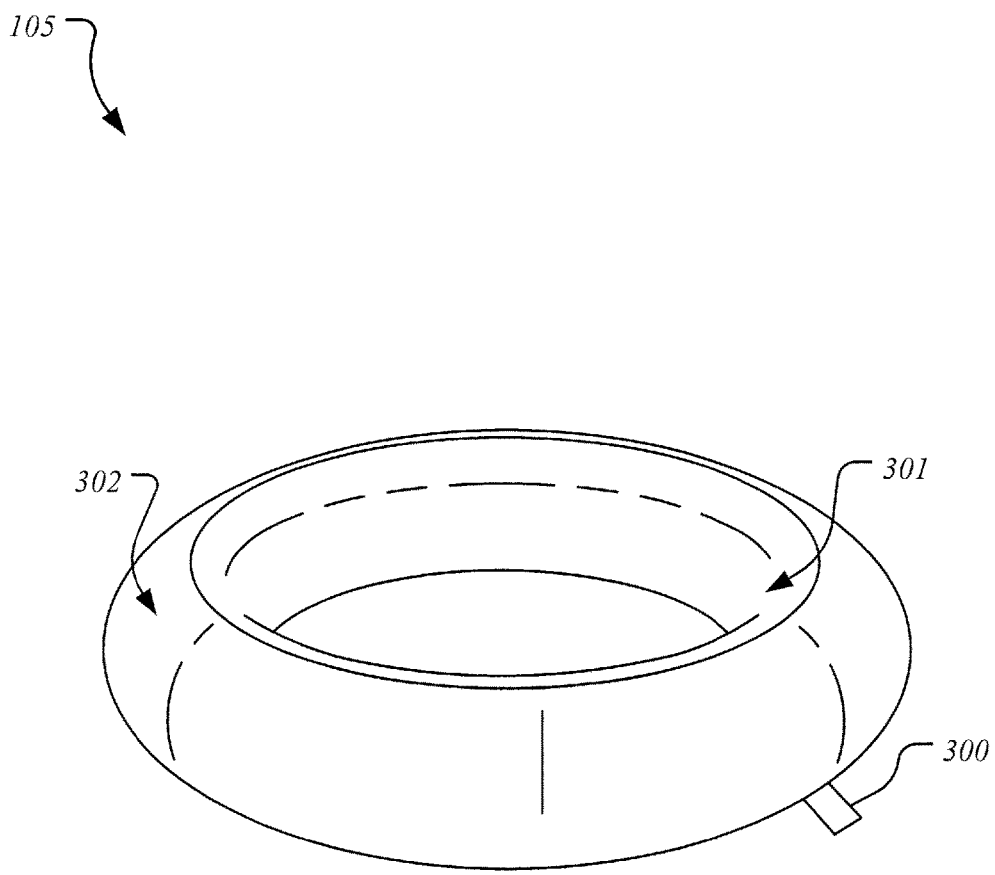
FIG. 3 illustrates a close up view of an exemplary ring, according to an embodiment.

FIG. 3 shows a close up view of an exemplary ring 105, according to an embodiment. As illustrated, ring 105 may be an inflatable ring that is adapted to float at the surface of a body of water when inflated with air or other gases. When inflated, ring 105 has a torodial shape having an inner surface 301 having an inner diameter and an outer surface 302 having an outer diameter. The inner surface forms the opening through the center of ring 105.

In some embodiments, ring 105 may include a device that automatically inflates ring 105. The device may be an automatic pump that pumps air into ring 105 when actuated. In some embodiments, the device may be configured to automatically inflate ring 105 with air when certain conditions are detected. For example, ring 105 may be automatically inflated by the device when ring 105 or the device makes contact with the water. In other embodiments, it may be desirable to inflate ring 105 before ring 105 makes contact with the water. In such cases, the device may include a timer and may be configured to inflate ring 105 after a predetermined amount of time has elapsed since the air drop system 100 is dropped from the aircraft. Alternatively, the device may include an altimeter and may be configured to automatically inflate ring 105 when the air drop system 100 approaches a predetermine altitude (e.g., 50 feet above the water).

In some embodiments, ring 105 may include a valve 300 along the outer surface 302 that may be opened to release the air from ring 105. Valve 300 may be located along the outer surface 302 of ring 105 because the suspension lines 103 pass through the center of ring 105 along the inner surface 301. Thus, by placing valve 300 on the outer surface 302 prevents the suspension lines 103 from getting caught on the valve 300. Valve 300 may be a separate valve from the one used by the device to inflate ring 105. In some embodiments, valve 300 may be a removable plug or cap that may be coupled to weight 106 with a tether. The plug may be removed by the tether as weight 106 begins to sink and tug on the tether. Once sufficient amount of air is released, ring 105 may also sink in the water.

As described, suspension lines 103 pass through the opening of ring 105. As suspension lines 103 pass through the opening, suspension lines 103 may contact the surface of the ring 105. More particularly, the suspension lines 103 may slide against the inner perimeter 301 of the ring 105 as suspension lines 103 pass through the opening. In order to facilitate smoothly sliding suspension lines 103 against the surface of ring 105, ring 105 may be made of a material that has a surface coefficient of friction of about 0.05 to about 0.1. In some embodiments, the inner surface 301 of the ring 105 may be coated with a material that has a surface coefficient of friction of about 0.05 to about 0.1 instead of the entire ring 105 being made of this material. By way of example and not of limitation, the inner surface may be coated with polytetrafluoroethylene (PTFE) (e.g., Teflon) or other rigid nylon material to create a surface having the desired surface coefficient of friction. Outer surface 302 of ring 105 may not necessarily be made of, or be coated with a material having the same surface coefficient of friction. In some embodiments, inner surface 301 and outer surface 302 may be made of different materials and/or coatings. The coating on inner surface 301 may act as a reinforcement of the ring 105 to prevent inflatable ring 105 from inadvertently rupturing.

Turning back to FIGS. 1-2, a block of weight 106 is coupled between suspension lines 103 and cargo 104. Weight 106 is configured such that when cargo 104 lands in the body of water, weight 106 is disconnected from cargo 104 to separate cargo 104 from the air drop system 100. Once separated, weight 106 is adapted to drag the parachute 101 further underwater by pulling on suspension lines 103.

Figure 4A:
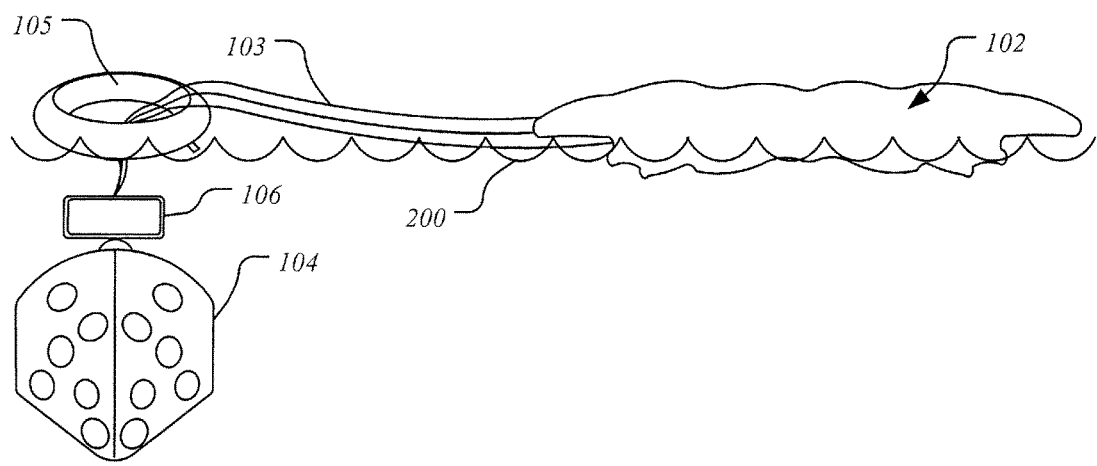
FIGS. 4A-4E illustrate the air drop system at various stages after landing in the body of water, according to an embodiment.
Figure 4B:
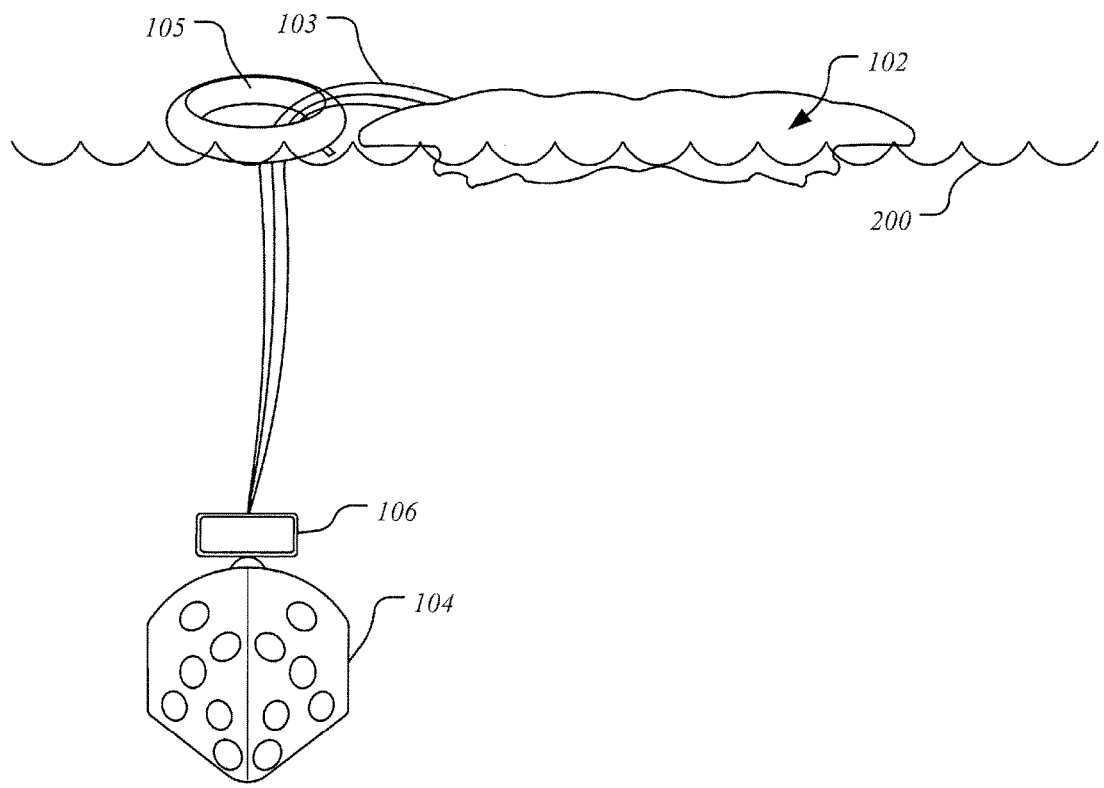

FIGS. 4A-4E illustrate air drop system 100 when cargo 104 lands in water 200. Accordingly, FIG. 4A shows an instantaneous moment when cargo 104 lands in water 200 and submerges just below the surface of water 200. As illustrated, cargo 104 and weight 106 submerged are below the surface of the water 200 and ring 105 is inflated and floating at the surface of the water 200. FIG. 4B shows cargo 104 and weight 106 sinking further down into the body of water. According to an embodiment, as weight 106 begins to sink, ring 105 begins to slowly deflate because weight 106 pulls on the tether coupled to the plug which releases air from ring 105. It should be noted that valve 300 may be sized such that ring 105 deflates at a rate that is slow enough to allow sufficient time for suspension lines 103 to be pulled through ring 105 and sufficient time for canopy 102 to collect at the ring 105. If ring 105 deflates too quickly, then ring 105 will sink before canopy 102 collects at ring 105, and thus, the air drop system 100 may begin to sink uncontrollably which increases the chances of entanglement. Furthermore, the surface coefficient of friction along the inner surface 301 of ring 105 when in a deflated or a partially deflated state is greater than the surface coefficient of friction when ring 105 is fully inflated. Thus, if ring 105 deflates too soon (or too fast), then suspension lines 103 may slide through ring 105 more slowly and therefore, ring 105 may sink before the entire length of suspension lines 103 has pass through ring 105. In other works, ring 105 may sink before it has done its job of collecting parachute 101 to prevent it from entanglement.

Figure 4C:
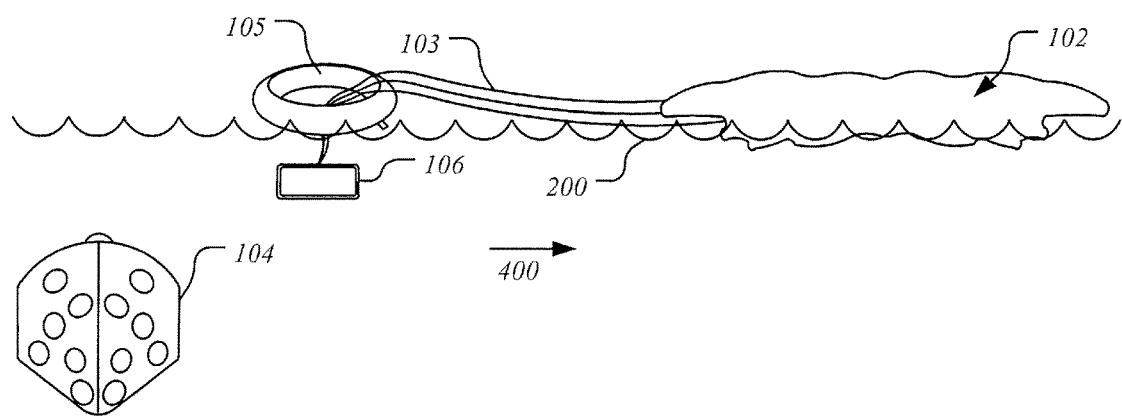

FIG. 4C shows cargo 104 being detached from weight 106, thus freeing cargo 104 from the rest of the air drop system 100. Cargo 104 may be detached from weight 106 at a predetermined moment after cargo 104 lands in water 200. In some embodiments, a weight releasing device including an actuator may be configured to detach cargo 104 immediately and automatically after making contact with water 200. In other embodiments, the actuator may be configured to wait a predetermined amount of time (e.g., 30 seconds) after making contact with water 200. As weight 106 begins to pull suspension lines 103 through ring 105, canopy 102 of parachute 101 is still floating at the surface of the water 200. It should be noted that portions of parachute 101 may still be filled with air after landing in the water as it takes a few minutes for canopy 102 to soak up the water and to begin to sink. Also, because canopy 102 occupies a larger surface area on the water relative to ring 105, canopy 102 creates a larger drag on the water compared to ring 105. Therefore, as weight 106 sinks, the tension created by the suspension lines 103 against the inner surface 301 of the ring 105 causes the ring 105 to be pulled in a horizontal direction toward the canopy 102 (shown with arrow 400). Accordingly, ring 105 acts a moving pivot point for suspension lines 103.

Figure 4D:
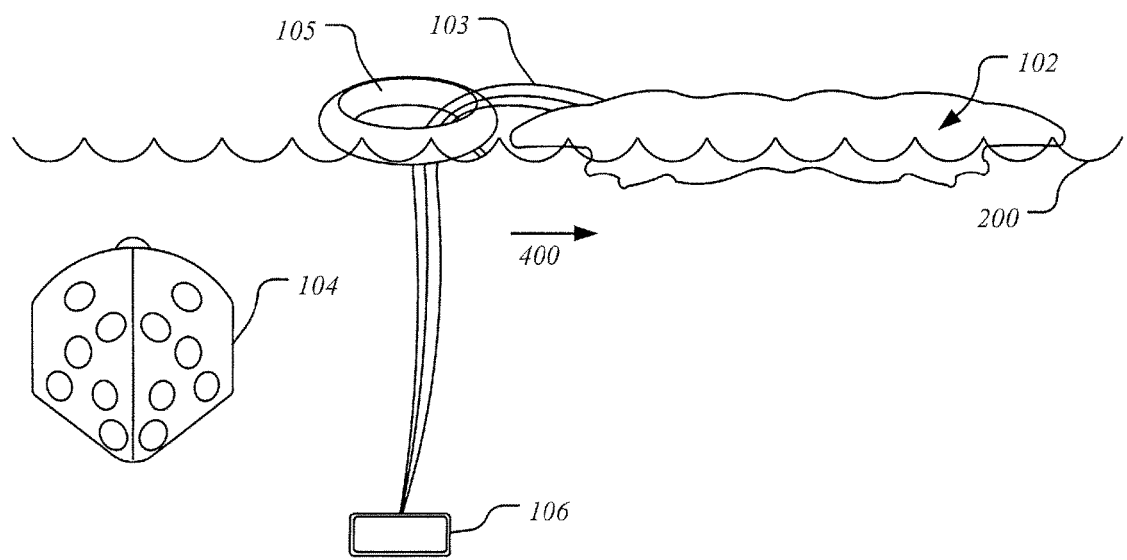
Figure 4E:
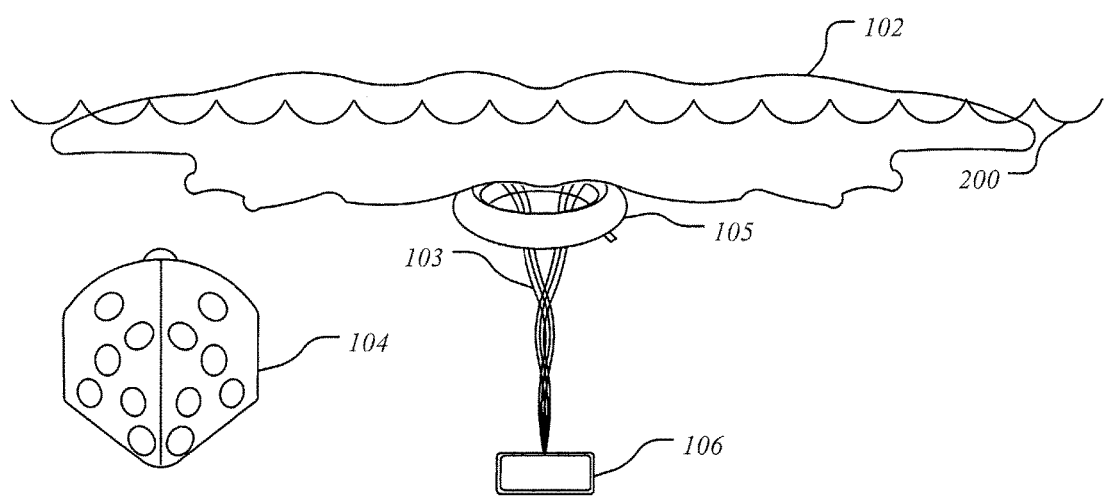

FIG. 4D shows that weight 106 has further sunk and ring 105 is moving closer toward the direction of the canopy 102 on the surface of the water. Meanwhile, cargo 104 may still be neutrally buoyant and stationary, and as ring 105 moves closer toward canopy 102, the separation distance between the suspension lines 103 and cargo 104 become greater, thus further separating them to avoid entanglement. FIG. 4E shows weight 106 that has sunk even deeper in the water and canopy 102 beginning to collect inside ring 105. At this point, cargo 104 is separated and away from parachute 101. Thus, cargo 104 (e.g., autonomous underwater vehicle) may freely maneuver without worrying of entanglement with parachute 101.

Once canopy 102 collects at ring 105 and suspension lines 103 and/or canopy 102 can no longer be pulled through ring 105, and ring 105 is deflated, weight 106 will drag both parachute 101 and ring 105 underwater until it is completely sunk. In some embodiments, weight 106 may weigh about 10-100 pounds. However, the specific weight of weight 106 may vary depending at least on the size of the parachute. For example, a larger parachute such as the G-12 parachute may need a heavier weight to pull the parachute through the ring 105 compared to a smaller parachute such as a T-10 parachute, which may function with a lighter weight.

In some embodiments, if the parachute 101 is small enough (e.g., small relative to the size of the opening of the ring), the entire canopy 102 may also pass through the center of the ring 105. For example, if the canopy 102 can fit in the opening of ring 105 without collecting at ring 105, then parachute 101 may be considered to be sufficiently small enough to pass through the center of the ring 105. In this case, parachute 101 and weight 106 may sink to the bottom of the body of water without the ring 105 and the ring 105 may remain floating at the surface of the water.

Figure 5:
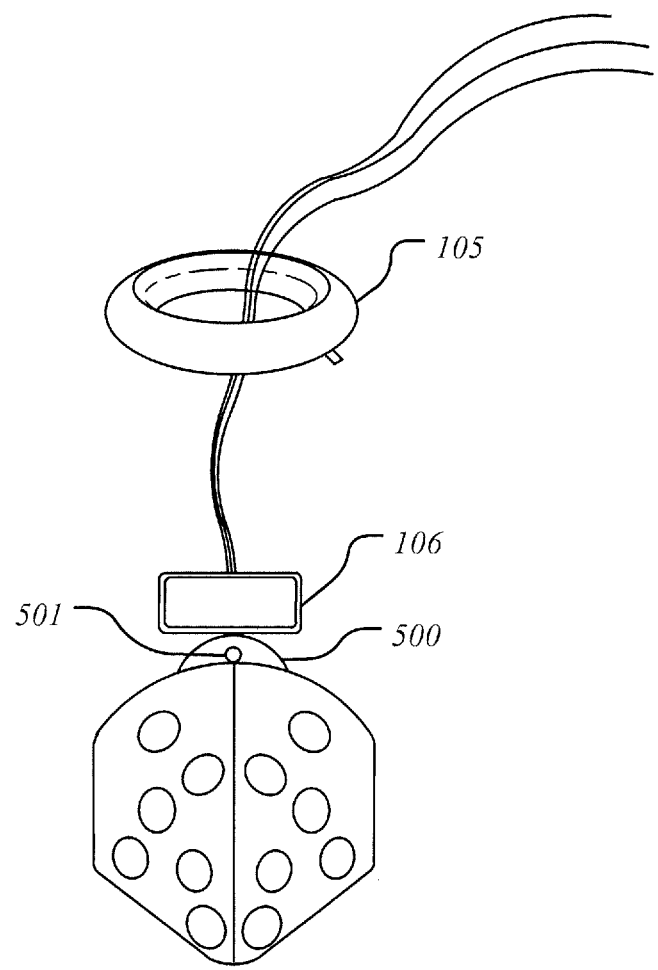
FIG. 5 illustrates a side view of the air drop system, according to an embodiment.

FIG. 5 illustrates a side view of air drop system 100 with the parachute 101 deployed and the weight 106 still attached to cargo 104. According to an embodiment, weight 106 and cargo 104 are coupled to each other with a dome-shaped mount 500 therebetween. Mount 500 is attached to the cargo 104 and serves at least two purposes. First, mount 500 includes a weight releasing device 501 which may be utilized to connect and/or disconnect weight 106 and the cargo 104. Second, the mount 500 is used to ensure that weight 106 does not remain on cargo 104 when weight 106 is disconnected. More specifically, if the top of cargo 104 is a flat or a substantially flat surface, then, even after weight 106 is detached, weight 106 may not fall off of cargo 104, thus preventing weight 106 from sinking and separating away from cargo 104. To prevent this from happening, the side of mount 500 that faces weight 106 is curved (e.g., a dome or hemispherical shape) so that weight 106 will fall off even if the top surface of cargo 104 is flat, and cargo 104 is relatively stable in the water (e.g., cargo 104 does not rock back and forth or tip over from water current).

Figure 6A:
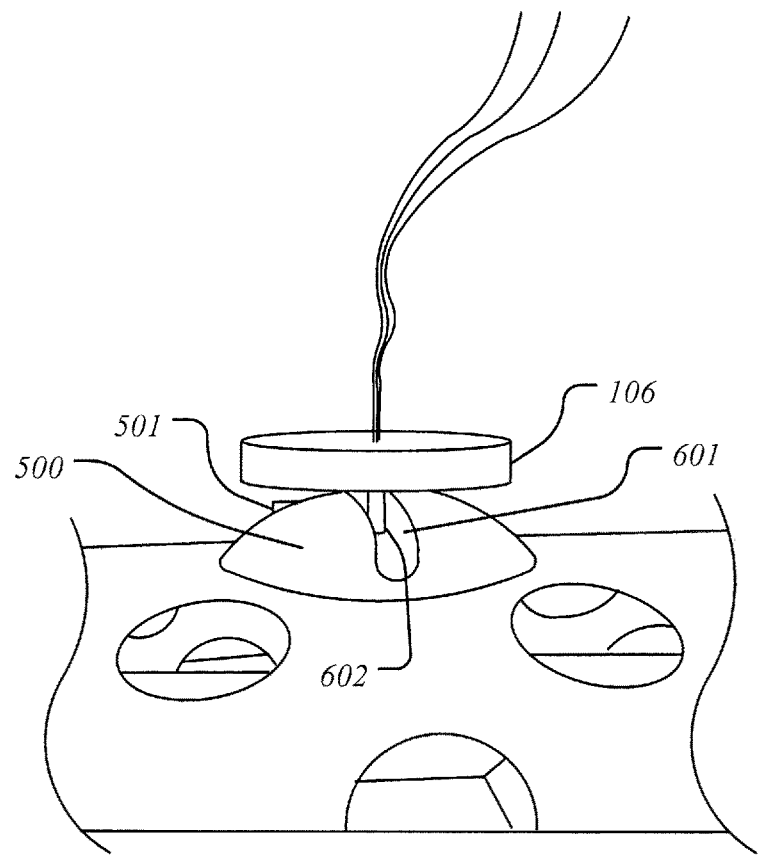
FIG. 6A-6C illustrate close up views of a mount and a weight releasing device for connecting and releasing the cargo from the weight, according to an embodiment.
Figure 6B:
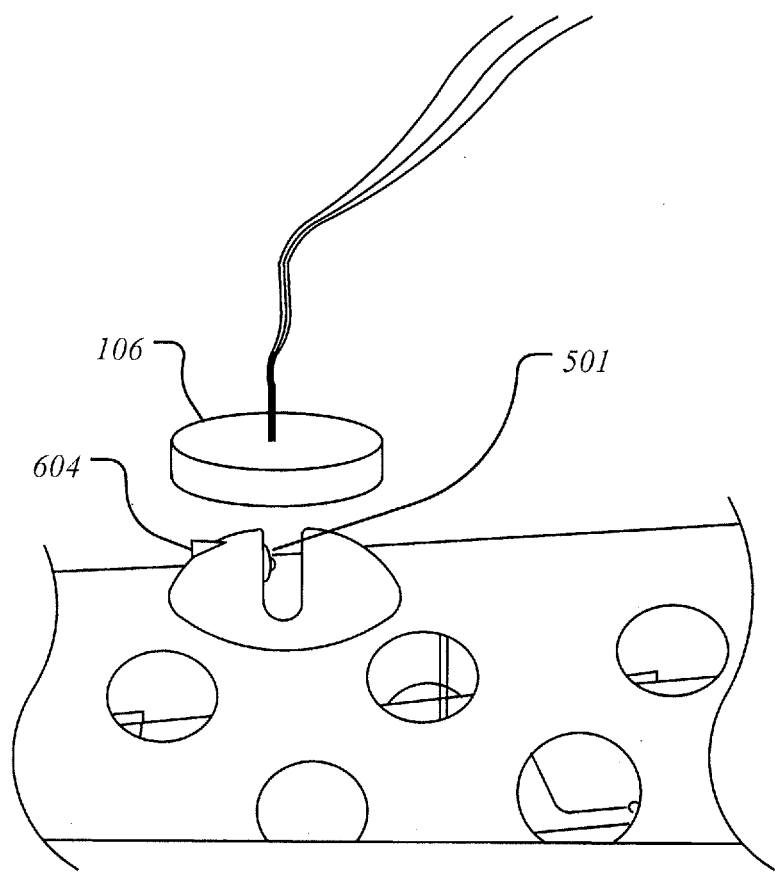
Figure 6C:
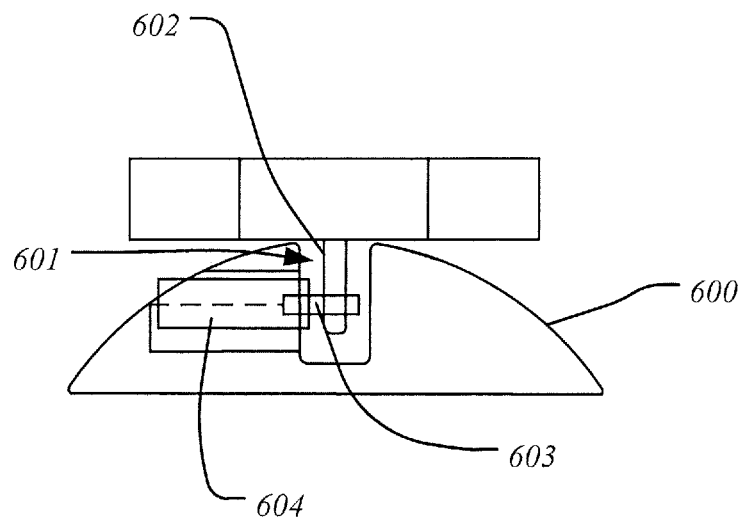

FIGS. 6A-6B illustrate perspective views and FIG. 6C illustrates a cross-sectional side view of mount 500 and weight releasing device 501 according to various embodiments of the disclosure. As illustrated, mount 500 has a curved surface with a gap 601 along the center of the mount. A hoist 602 may protrude from weight 106 and into gap 601 when weight 106 is positioned on the mount 500.

In FIGS. 6A-6C, mount 500 is attached to the top of cargo 104, and weight 106 is connected to mount 500 with a weight releasing device 501. Mount 500 has a gap 601 (e.g., an opening) along the middle of the mount 500 which houses the weight releasing device 501. In some embodiments, a weight releasing device 501 includes a pin 603 and an actuator 604. When coupled, hoist 602 (which is attached to weight 106) is inserted in gap 601 and pin 603 may be utilized to lock hoist 602 in place. In this manner, parachute 101 is connected to weight 106, and weight 106 is connected to mount 500 (by the hoist 602), and mount 500 is connected to cargo 104. Actuator 604 may be utilized to disengage pin 603 from hoist 602 of weight 106 when cargo 104 lands in the body of water. Alternatively, pin 603 may be removed manually by a human operator. Once pin 603 is removed, weight 106 becomes physically unstable on the curved mount 500 and falls off to the side of cargo 104. In some embodiments, weight 106 may have a hole in the center and suspension lines 103 may also be connected to hoist 602 by passing through the hole.

Figure 7:
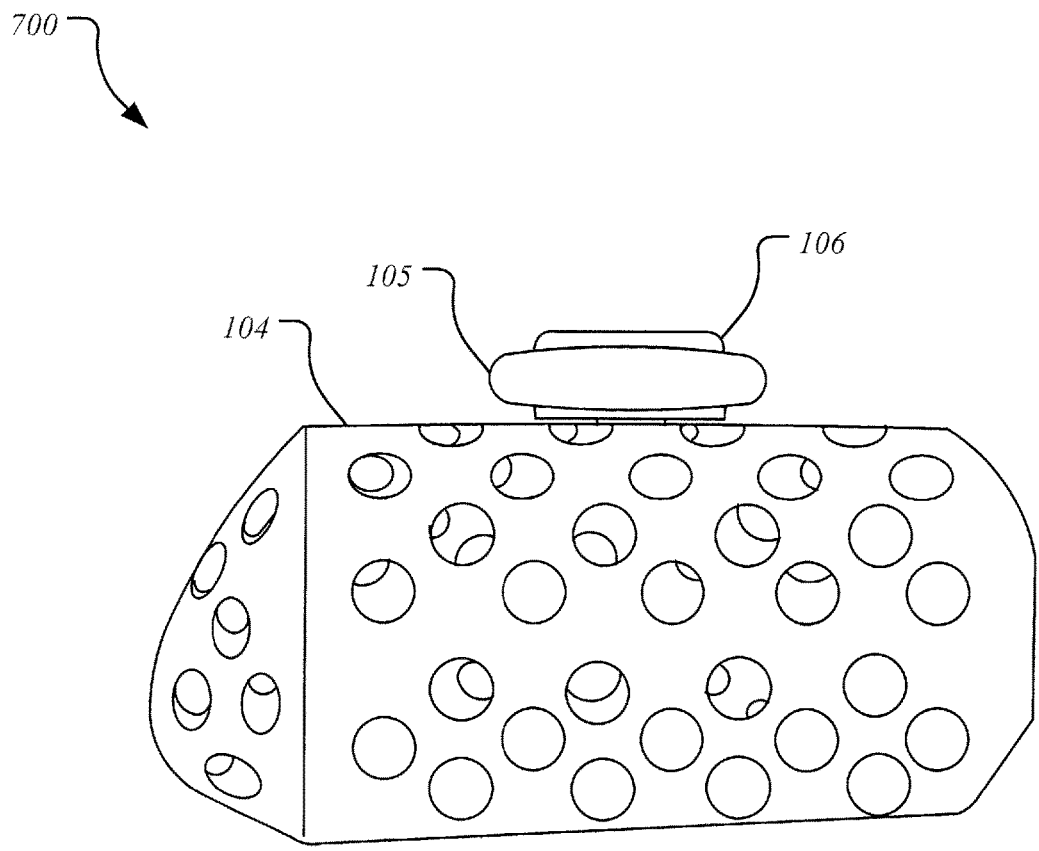
FIG. 7 illustrates an air drop system in an assembled state ready-to-deploy from an aircraft, according to an embodiment.

FIG. 7 illustrates air drop system 700 in an assembled stated before it is aerially delivered from an aircraft. According to an embodiment, weight 106 is attached to mount 500, which is attached to cargo 104. Ring 105 is in a deflated stated (e.g., no air inside the ring and flat) and is positioned on the weight 106. Parachute 101 is packed inside of a parachute bag according to methods known to those having ordinary skill in the art. The packed parachute 101 is placed on the deflated ring 105, thus forming a compact air drop system 100 that is ready to be deployed. Packed parachute 101 may have a static line connected to the aircraft, which opens the parachute when the air drop system 700 is pushed out of a flying aircraft.

In this assembled condition, the air drop system 100 may now be loaded on to an aircraft and deployed over a body of water. When system 100 is pushed off of the aircraft, the parachute 101 may be deployed according to one or more methods known to those having ordinary skill in the art.

Figure 8:
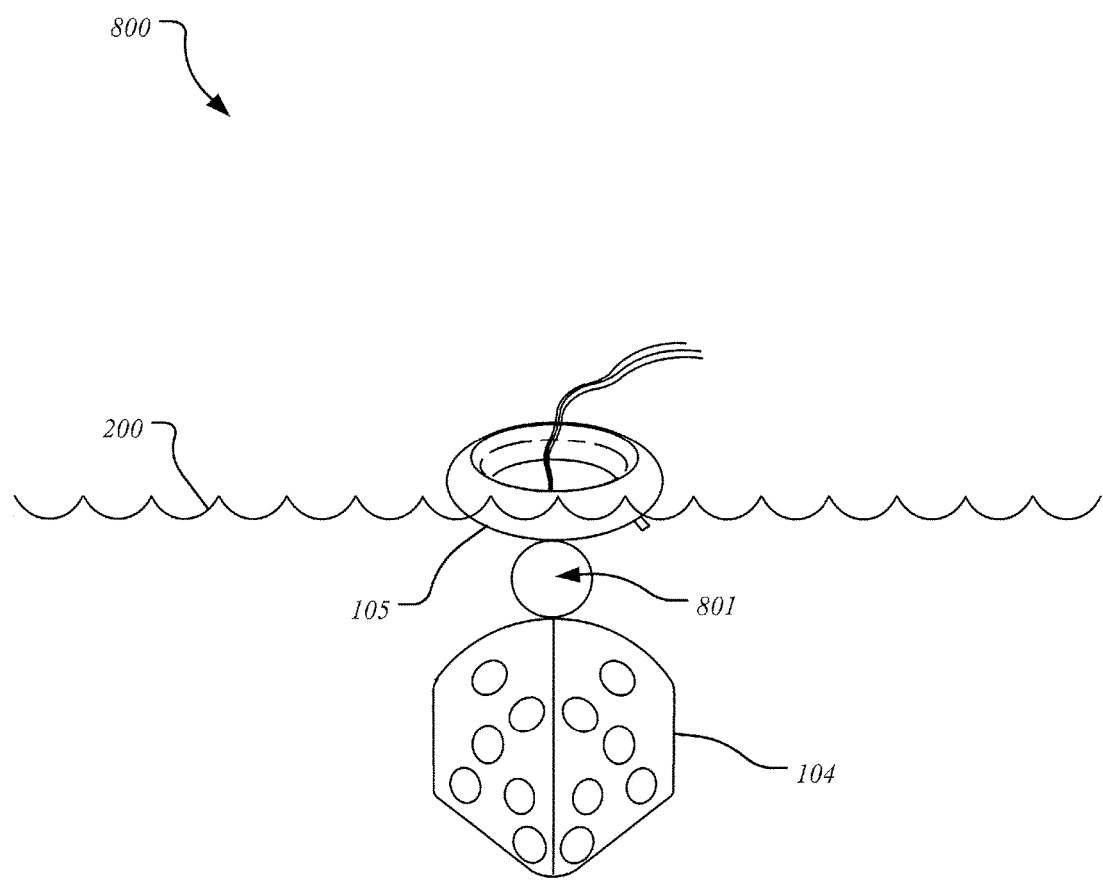
FIG. 8 illustrates an air drop system that includes a reel, according to another embodiment.

FIG. 8 illustrates an air drop system 800 according to another embodiment, which further includes a reel 801 for reeling in suspension lines 103 of parachute 101 instead of utilizing a weight to pull the suspension lines toward the bottom of the body of water. According to the embodiment, the reel 801 is attached to the top of the cargo 104 and the parachute 101 is attached to the reel 801. Similar to the embodiment illustrated in FIG. 2, an inflatable ring 105 is disposed between parachute 101 and cargo 104 with suspension lines 103 passing through the center of inflatable ring 105. When cargo 105 lands in the body of water 200, reel 801 is detached from cargo 104 by actuating a reel releasing device. Once the reel releasing device detaches cargo 104 from parachute 101, the cargo 104 and the parachute 101 may begin to drift away from each other and reel 801 may wind in suspension lines 103. By way of example, reel 801 may be an air powered reel that is actuated at a predetermined time such as when reel 801 reaches a certain depth after landing in the water, or after a certain amount of time has passed after the reel 801 contacts the water (e.g., 15 seconds after reel 801 makes contacts with the water). A person having ordinary skill in the art would appreciate that other types of reel may be utilized to wind the suspension lines 103.

While the reel 801 may be utilized to wind suspension lines 103 in order to pull suspension lines 103 through the inflatable ring 105, the reel 801 may also act as a weight. Therefore, even if the reel 801 malfunctions, it may still utilized as a weight to pull the suspension lines 103 through the center of the ring 105 as the reel sinks into the water.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative teens are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the disclosure, it will be understood that when an element or layer is referred to as being "on," "connected to,"

or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A system comprising:
   a parachute comprising a canopy and suspension lines;
   a weight coupled to a first end of the suspension lines, the weight being couplable to a cargo;
   a ring configured to float in a body of water and being disposed between the weight and the canopy, the suspension lines passing through a center of the ring; and
   a weight releasing device coupled to the weight and configured to detach the cargo from the weight such that upon separation, the weight is configured to sink in the body of water while coupled to the first end of the suspension lines.

2. The system of claim 1, wherein the weight releasing device is configured to attach to a mount on the cargo.

3. The system of claim 2, wherein the mount comprises a curved surface such that when the cargo is detached from the weight, the weight is adapted to fall off of the mount.

4. The system of claim 2, wherein the weight is configured to separate from the cargo in response to the weight releasing device detaching the weight from the cargo, wherein the sinking of the weight pulls the suspension lines through the center of the ring.

5. The system of claim 4, wherein the canopy is coupled to a second end of the suspension lines, the suspension lines and the canopy being adapted to collect at the ring in response to the weight pulling the suspension lines through the center of the ring, the suspension lines and the canopy being separated from the cargo.

6. The system of claim 4, wherein the ring is an inflatable ring comprising a valve configured to be opened by the sinking of the weight to deflate the ring.

7. The system of claim 6, wherein the valve is coupled with the weight via a tether.

8. The system of claim 1, wherein the ring comprises an inner surface along an inner perimeter of the ring and an outer surface along an outer perimeter of the ring, the inner surface comprising a surface coefficient of friction of about 0.05 to about 0.1.

9. The system of claim 1, wherein the ring comprises an inner surface along an inner perimeter of the ring and an outer surface along an outer perimeter of the ring, the inner surface comprising a polytetrafluoroethylene (PTFE) coated surface.

10. A method of deploying the system of claim 1, the method comprising:
    dropping the system from an aircraft such that the system descends to the body of water with the parachute deployed;
    detaching the cargo from the weight after the cargo enters the body of water such that the cargo and the weight separate from each other and the weight sinks into the body of water; and
    pulling the suspension lines by the detached weight through the center of the ring.

11. The method of claim 10, further comprising inflating the ring before the cargo impacts the body of water.

12. A method of assembling the system of claim 1, the method comprising:
    attaching the first end of the suspension lines to the weight;
    positioning the ring on the weight between the weight and the parachute; and
    packing the parachute and positioning the packed parachute on the ring.

13. The method of claim 12, further comprising attaching the weight to the cargo with a weight releasing device.

14. The method of claim 13, wherein the weight is attached to a mount on the cargo with the weight releasing device.

15. The method of claim 12, wherein the ring is in a deflated form, the ring being configured to inflate before the ring impacts the body of water.

16. The method of claim 12, wherein the ring is in a deflated form and the ring comprises a device configured to automatically inflate the ring in response to the cargo impacting the body of water.

17. A method for air-dropping cargo to a body of water using a parachute, the method comprising:

releasing the cargo from a weight coupled to suspension lines of a parachute after the cargo enters the body of water;
pulling the suspension lines, by sinking the weight due to gravity, through a center of a ring floating on a surface of the body of water; and
collecting the parachute at the ring.

18. The method of claim 17, further comprising:
ejecting the cargo from an aircraft utilized for the air-dropping of the cargo;
deploying the parachute to controllably descend the cargo toward the body of water; and
inflating the ring before the cargo impacts the body of water.

19. The method of claim 17, wherein the releasing of the cargo from the weight comprises automatically activating an actuator configured to detach the weight from the cargo.

* * * * *